Aug. 29, 1967     G. BLOOM ET AL     3,338,097
MASS FLOWMETER
Original Filed Feb. 4, 1963

INVENTORS
BERNARD FISHMAN
GERALD BLOOM
BY *Edwin E. Greigg*
ATTORNEY

United States Patent Office 3,338,097
Patented Aug. 29, 1967

3,338,097
MASS FLOWMETER
Gerald Bloom, Spring Valley, N.Y., and Bernard Fishman, Fort Lee, N.J., assignors, by mesne assignments, to Flo-tron Inc., a corporation of New Jersey
Original application Feb. 4, 1963, Ser. No. 255,775, now Patent No. 3,240,061, dated Mar. 15, 1966. Divided and this application Feb. 15 1966, Ser. No. 527,595
10 Claims. (Cl. 73—205)

This is a divisional application of Ser. No. 255,775, filed Feb. 4, 1963, now U.S. Patent No. 3,240,061.

This invention relates to apparatus adapted to measure rate of flow of liquids and more particularly relates to flowmeters adapted to measure mass flow rate in a linear manner.

Flowmeters adapted to measure the rate of flow through a conduit can usually be classified into one of three types; namely, volumetric, differential pressure and mass-rate.

In the volumetric flowmeter, the flow of fluid causes a propeller or turbine to revolve with an angular velocity proportional to the volume of fluid passing through it. In other embodiments, the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readout.

Differential pressure flowmeters measure flow rate by sensing the differential pressure across an orifice or in a venturi, flow nozzle, pitot tube, or other such device. The velocity head or kinetic energy due to the fluid velocity is measured in this kind of meter. Since there is a known relationship between velocity head and fluid velocity for each specific meter, the fluid velocity can be determined by the following formula:

$$V = C\sqrt{\frac{2g\Delta P}{S}} = C\sqrt{\frac{2\Delta P}{\rho}}$$

where:
$V$ = Velocity of fluid
$C$ = Metering element coefficient
$g$ = Gravity constant
$\Delta P$ = Differential pressure
$S$ = Specific weight of fluid
$\rho$ = Density of fluid = $S/g$ mass flow rate is equal to:

$$M = \rho A V = C A \sqrt{2\rho \Delta P}$$

where:
$M$ = Mass flow rate
$A$ = Flow area of the metering element cross section Therefore, using known differential pressure flowmeters to obtain mass flow rate measurements also requires measurement of density and extraction of the square root of the read out. Further, the differential pressure output signal by itself has a non-linear relationship to the flow rate and cannot be related to either the mass or volumetric flow rate except by including a fluid density factor.

There are two basic types of mass rate flowmeters; namely, angular momentum and recirculating type meters. In the former, angular momentum is imparted to the flowing fluid, usually by means of a constant speed driving motor and the read-out signal is obtained from the torque generated. This type of mass rate flowmeter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added to or substracted from the fluid being measured. The subject invention is an improved flowmeter of this type.

The present invention is based upon the same principle as embodied in U.S. Patent No. 3,015,233 but has features which permit simplification, size reduction and which give substantial improvement over this patented device. Furthermore, the present invention constitutes a division of application Ser. No. 255,775, filed Feb. 4, 1963, and entitled Mass Flowmeter.

It is an object of this invention to provide a flowmeter which uses a single differential pressure indicator or transducer to obtain a linear indication of mass flow rate of fluids having different densities.

It is another object of this invention to provide such a flowmeter which uses a single differential pressure across a single flow restrictor.

It is another object of this invention to provide such a flowmeter which uses a single differential pressure across a single oscillating flow restrictor.

It is another object of this invention to provide a novel flowmeter which is displaced in a cyclic manner.

Other objects and a fuller understanding of the invention may be had by referring to the following description and claims taken in conjunction with the accompanying drawings in which:

Figure 1:
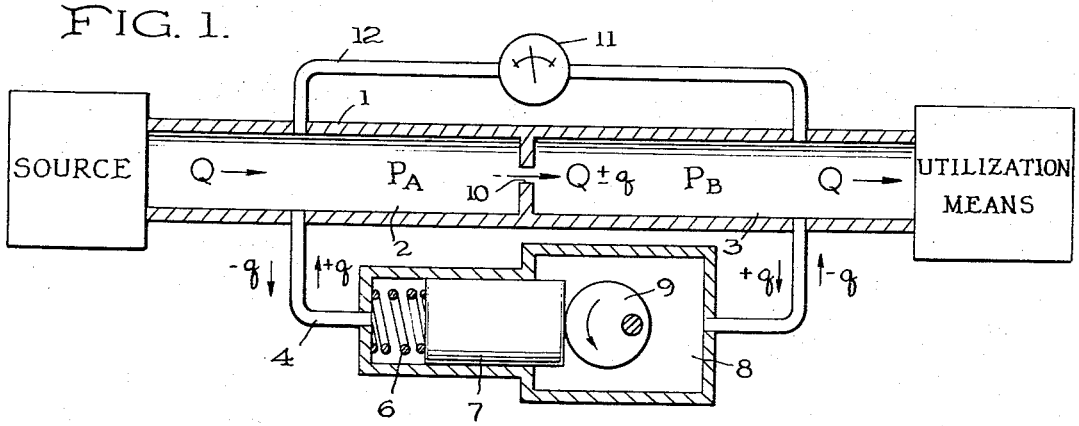
FIGURE 1 is a schematic drawing of a flowmeter with a single flow restrictor and a single differential pressure indicator or transducer.

FIGURE 1 shows a schematic drawing of a conduit 1 through which variable input and output volumetric flow Q is directed from, for example, any well known source of fluid such as a reservoir to any wall known fluid utilization or receiving means. The conduit 1 has two sections 2 and 3 spaced therealong and each of these sections is bridged by branch conduits 4 and 5 respectively which have a reciprocating plunger 7 disposed intermediate the ends thereof. Reciprocating plunger 7 operates by means of cam 9 and spring 6.

This reciprocating plunger 7 alternately adds flow to and subtracts flow from the flow in conduit 1. As plunger 7 is forced to the left against spring 6 by eccentric 9, a flow $+q$ is generated in conduit 4 and a like flow $+q$ is generated into chamber 8. In this mode of operation the flow through flow restrictor 10 is the summation of flows, $Q+q$. As eccentric 9 continues to rotate, plunger 7 changes direction of motion and is forced to the right by spring 6. The flow in conduit 4 and the flow into chamber 8 also change direction, so that the flows in each can be expressed as $-q$ in this mode of operation, and the flow through restrictor 10 then becomes the difference in flows, $Q-q$.

It has been found that by connecting a meter through line 12 adapted to measure the differential pressure between these sections 2 and 3, such as a differential pressure transducer 11 a reading can be obtained which linearly closely approximates the mass flow rate through the conduit 1.

The flow through an orifice can be described mathematically by the equation:

(1) $$\Delta P = \frac{\rho Q^2}{2C^2 A^2}$$

With a constant recirculating flow of $q$, the difference in pressure drops across two orifices can be described as follows:

(2) $$\Delta P_1 - \Delta P_2 = \frac{\rho}{2C^2 A^2}[(Q+q)^2 - (Q-q)^2]$$

which reduces to (3) $$\Delta P_1 - \Delta P_2 = \frac{2q}{C^2 A^2}(\rho Q) = KM$$

where $\Delta P$ = Pressure drop across each flow restrictor
$\rho$ = Fluid density
$C$ = Flow coefficient
$A$ = Flow restrictor area
$q$ = Recirculating flow rate (volumetric)
$Q$ = Process flow rate (volumetric)

$K = \frac{2q}{C^2 A^2}$ (a constant)

$M = \rho Q$ (mass flow rate)

In the embodiment shown in FIGURE 1, a single flow restrictor 10 is used with reciprocating plunger 7. Reciprocating plunger 7 alternately adds flow to and subtracts flow from the process flow. Thus, the pressure drop across the flow restrictor 10 varies in such a way that:

(4) $$\Delta Pi = \frac{\rho}{2C^2 A^2}(Q + qi)^2$$

where $\Delta Pi$ = instantaneous value of pressure differential
$qi$ = instantaneous value of recirculating flow If the pressure differential is measured where $qi = +q$ and again $qi = -q$ and the second value of $\Delta P$ is subtracted from the first, the result will be:

(5) $$\Delta P_1 - \Delta P_2 = \frac{\rho}{2C^2 A^2}[(Q+q)^2 - (Q-q)^2] = KM$$

Figure 2:
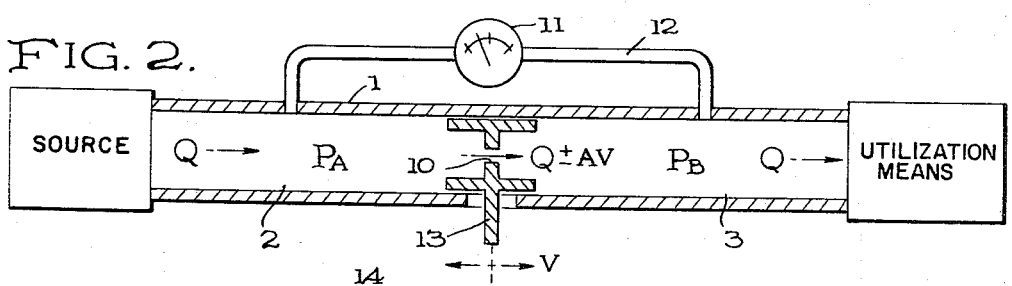
FIGURE 2 is a schematic drawing of a flowmeter with an oscillating flow restrictor and a single differential pressure indicator or transducer.

In FIGURE 2, the same principle is used in connection, for example, in measuring flow from a source to a utilization means such as shown in FIGURE 1 with the alternative arrangement, consisting of a flow restrictor 10 with a means 14 for oscillating said flow restrictor 10 through connection 13 so there is a component of the oscillating motion which is axial with conduit 1. In this embodiment if the flow restrictor 10 has an instantaneous axial displacement rate $Vi$ and since $ViA = qi$, then the instantaneous flow rate $Qi$ through the flow restrictor 10 will be as follows:

(6) $$Qi = Q + qi$$

As in the arrangement shown in FIGURE 1, when $qi = q$ and $qi = -q$ the result will be:

(7) $$\Delta P_1 - P_2 = \frac{\rho}{2C^2 A^2}[(Q+q)^2 - (Q-q)^2] = KM$$

In either arrangement shown in FIGURES 1 and 2, the pressure differentials may be measured at any points where $qi = +q$ and $-q$. Normally, however, the most convenient values are those in which $+q$ and $-q$ are maximum, or peak values.

This can then be sensed and indicated by one of several "peak-to-peak" measuring devices, as for example, a strain gauge type of pressure transducer together with a vacuum tube voltmeter.

Figure 3:
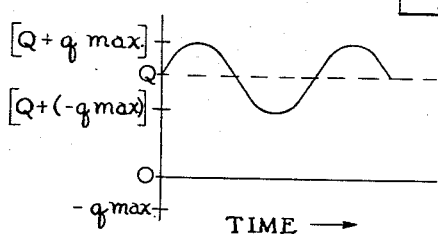
FIGURE 3 is a graph illustrating the effect of oscillation on flow and pressure drop.
Figure 4:
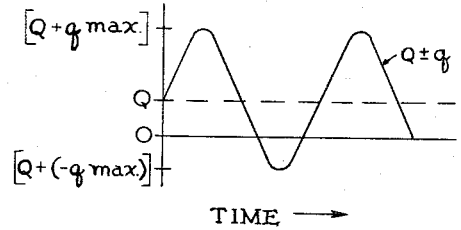
FIGURE 4 is another graph illustrating the effect of oscillation on flow and pressure drop.
Figure 4:
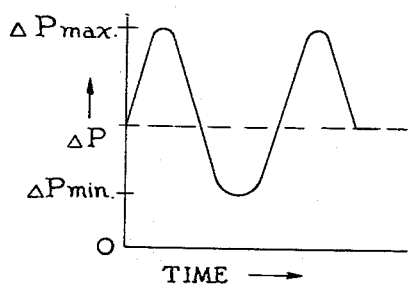
Figure 4:
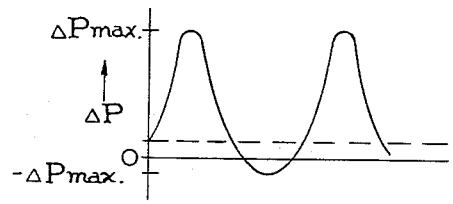

In FIGURES 3 and 4, there are shown pictorial representations of the way in which flow rate and pressure drop through the flow restrictor vary with time for the case in which $qi = +q$ max. and $-q$ max. are smaller than process flow rate $Q$, and the case where they are larger than $Q$, respectively.

In FIGURE 3, the flow through the flow restrictor is always in the same direction, so the pressure differential is always greater than zero. The mass flow rate is proportional to the difference between maximum and minimum pressure differentials, assuming a "peak-to-peak" measurement. In FIGURE 4, the flow through the flow restrictor constantly changes direction resulting in a pressure differential which periodically changes from positive to negative. In this case mass flow rate is proportional to the difference between maximum positive and maximum negative pressure differentials, assuming "peak-to-peak" measurement.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. A mass flowmeter adapted to measure the mass flow rate of fluid passing therethrough at a given volumetric flow rate comprising a flow restrictor positioned in said path of flow of fluid passing through the flowmeter, means for recurrently displacing said flow restrictor along said path of flow such that the instantaneous volumetric flow rate through said flow restrictor is equal to said given volumetric flow rate plus and minus a further volumetric flow rate resulting from said displacement, and means for measuring the resulting peak-to-peak pressure differentials developed across said flow restrictor at times when the further volumetric flow rates are plus and minus the same volume of further volumetric flow rate.

2. A mass flowmeter adapted to measure the mass flow rate of fluid passing therethrough at a given volumetric flow rate comprising a conduit, a flow restrictor positioned in said conduit in the path of flow of fluid passing through the flowmeter, means for oscillating said flow restrictor to provide a component of oscillating motion which is axial with said conduit such that the instantaneous volumetric flow rate through said flow restrictor is equal to said given volumetric flow rate plus and minus a further volumetric flow rate resulting from said displacement, and means for measuring the resulting peak pressure differentials developed across said flow restrictor at times when the further volumetric flow rates are plus and minus their peak values.

3. A mass flowmeter adapted to measure the mass flow rate $M$ of fluid passing therethrough at a volumetric flow rate $Q$ comprising a conduit having a flow restrictor positioned in said path of flow of fluid passing through said conduit, means for oscillating said flow restrictor to alternately add to and subtract from said volumetric flow rate $Q$ of fluid passing through said restrictor a supplemental volumetric flow rate $q$ of fluid, and means for obtaining a signal which changes linearly with a change in the mass flow rate $M$ comprising means for differentially measuring the peak amplitudes of pressure developed on both sides of said flow restrictor resulting from the alternate adding and subtracting of said supplemental volumetric flow rate $q$ of fluid.

4. A mass flowmeter for measuring the mass flow rate of fluid passing therethrough at a given volumetric flow rate comprising a flow restrictor positioned in said path of flow of fluid passing through the flowmeter, means for recurrently displacing said flow restrictor along said path of flow such that a supplemental volumetric flow rate of fluid is added to and subtracted from said given volumetric flow rate passing through said flow restrictor, means for measuring the maximum pressure difference occurring across said flow restrictor during the addition of said supplemental volumetric flow rate to derive a first signal and means for measuring the maximum pressure difference occurring across said restrictor during the removal of said supplemental volumetric flow rate to derive a second signal, and means for algebraically combining said first and second signals.

5. In combination, a source of fluid, fluid utilization means, means for passing fluid from said source to said utilization means comprising a flowmeter, said flowmeter adapted to measure the mass flow rate of fluid being passed from said source to said utilization means at a volumetric flow rate Q, said flowmeter comprising a conduit having a flow restrictor positioned therein, means for recurrently displacing said flow restrictor along the path of flow of fluid through said conduit such that the instantaneous flow rate $Qi$ through said flow restrictor is equal to $Q \pm qi$ where $qi$ is the instantaneous volumetric flow rate resulting from said displacement, and means for differentially measuring the peak amplitudes of pressure developed on both sides of said flow restrictor resulting from said displacement.

6. In combination, a source of fluid, fluid utilization means, means for passing fluid from said source to said utilization means comprising a flowmeter, said flowmeter comprising a conduit having a flow restrictor positioned therein and adapted to measure the mass flow rate of fluid being passed from said source to said utilization means at a volumetric flow rate Q, means for adding to and subtracting from said flow rate Q a supplemental volumetric flow rate of fluid $q$ greater than Q, said last named means comprising means for oscillating said flow restrictor, and means for measuring the peak pressure differential across said flow restrictor at times when the supplemental volumetric flow rates added and subtracted have the same amplitudes.

7. In combination, a source of fluid, fluid utilization means, means for passing fluid from said source to said utilization means comprising a flowmeter, said flowmeter comprising a conduit having a flow restrictor positioned therein and adapted to measure the mass flow rate of fluid being passed from said source to said utilization means at a volumetric flow rate Q, means for adding to and subtracting from said flow rate Q a supplemental volumetric flow rate of fluid $q$ less than Q, said last named means comprising means for oscillating said flow restrictor, and means for measuring the peak pressure differentials across said flow restrictor corresponding to the peak values of supplemental volumetric flow rate being added or subtracted.

8. In combination, a source of fluid, fluid utilization means, means for passing fluid from said source to said utilization means comprising a conduit having a flow restrictor, means for measuring the mass flow rate of fluid comprising means for displacing said flow restrictor in a recurrent manner to have a component of displacement which is axial with said conduit, and means for differentially measuring the maximum and minimum pressure differentals developed across said flow restrictor resulting from said displacing.

9. A mass flowmeter adapted to measure the mass flow rate of fluid passing therethrough comprising a conduit having a flow restrictor, means for displacing said flow restrictor in a cyclic manner to add to and subtract from said passing fluid a supplemental volumetric flow rate of fluid, and means for differentially measuring the peak pressure differentials developed across said flow restrictor corresponding to the addition and subtraction of the same magnitude of supplemental volumetric flow rate of fluid.

10. A mass flowmeter adapted to measure the mass flow rate of fluid passing therethrough comprising a conduit having a flow restrictor, means for displacing said flow restrictor in an oscillating manner relative to said flow of fluid such that a component of the displacement is axial with said conduit, and means for differentially measuring the maximum and minimum pressure differentials developed across said flow restrictor resulting from said displacing.

References Cited
UNITED STATES PATENTS 2,779,193   1/1957   Lee _____ 73—194

JAMES J. GILL, *Acting Primary Examiner.*

RICHARD C. QUEISSER, *Examiner.*

E. D. GILHOOLY, *Assistant Examiner.*

UNITED STATES PATENT OFFICE

CERTIFICATE OF CORRECTION

Patent No. 3,338,097                         August 29, 1967

Gerald Bloom et al.

It is hereby certified that error appears in the above numbered patent requiring correction and that the said Letters Patent should read as corrected below.

Column 2, line 6, after "fluid" insert -- flow --; line 45, for "wall" read -- well --; column 6, line 9, after "fluid" insert -- being passed from said source to said utilization means --.

Signed and sealed this 23rd day of July 1968.

(SEAL)
Attest:

Edward M. Fletcher, Jr.                             EDWARD J. BRENNER
Attesting Officer                                        Commissioner of Patents